United States Patent [19]
Toman

[11] 3,971,026
[45] July 20, 1976

[54] MULTIPLE BEAM GLIDE SLOPE RADIO NAVIGATION METHOD WITH TWO CLASSES OF BEAMS

[75] Inventor: Donald J. Toman, Pleasantville, N.Y.

[73] Assignee: Tull Aviation Corporation, Armonk, N.Y.

[22] Filed: Feb. 14, 1975

[21] Appl. No.: 549,946

[52] U.S. Cl. .................. 343/108 M; 343/106 R; 343/109
[51] Int. Cl.² .................. G01S 1/18; G01S 1/44
[58] Field of Search ............ 343/108 M, 106 R, 109

[56] References Cited
UNITED STATES PATENTS
3,487,411  12/1969  Toman .................. 343/108 M Primary Examiner—Maynard R. Wilbur
Assistant Examiner—Richard E. Berger
Attorney, Agent, or Firm—Curtis Ailes

[57] ABSTRACT

Microwave carrier frequency energy is switched from one beam to another to provide a switched scanning beam for the glide slope function for an instrument landing system. The beams comprise a plurality of upper beams of uniform angular width in elevation and having a uniform angular center-to-center beam spacing in elevation, together with a class of lower beams consisting of at least one beam with each beam of said lower beams having a reduced angular width in elevation and a reduced spacing beneath the center line of the next higher beam which is proportional to the reduced beam width, the peak energy radiated at the center line of each lower beam being inversely proportional to the peak energy radiated in each of said upper beams as a function of the respective beamwidths.

16 Claims, 7 Drawing Figures

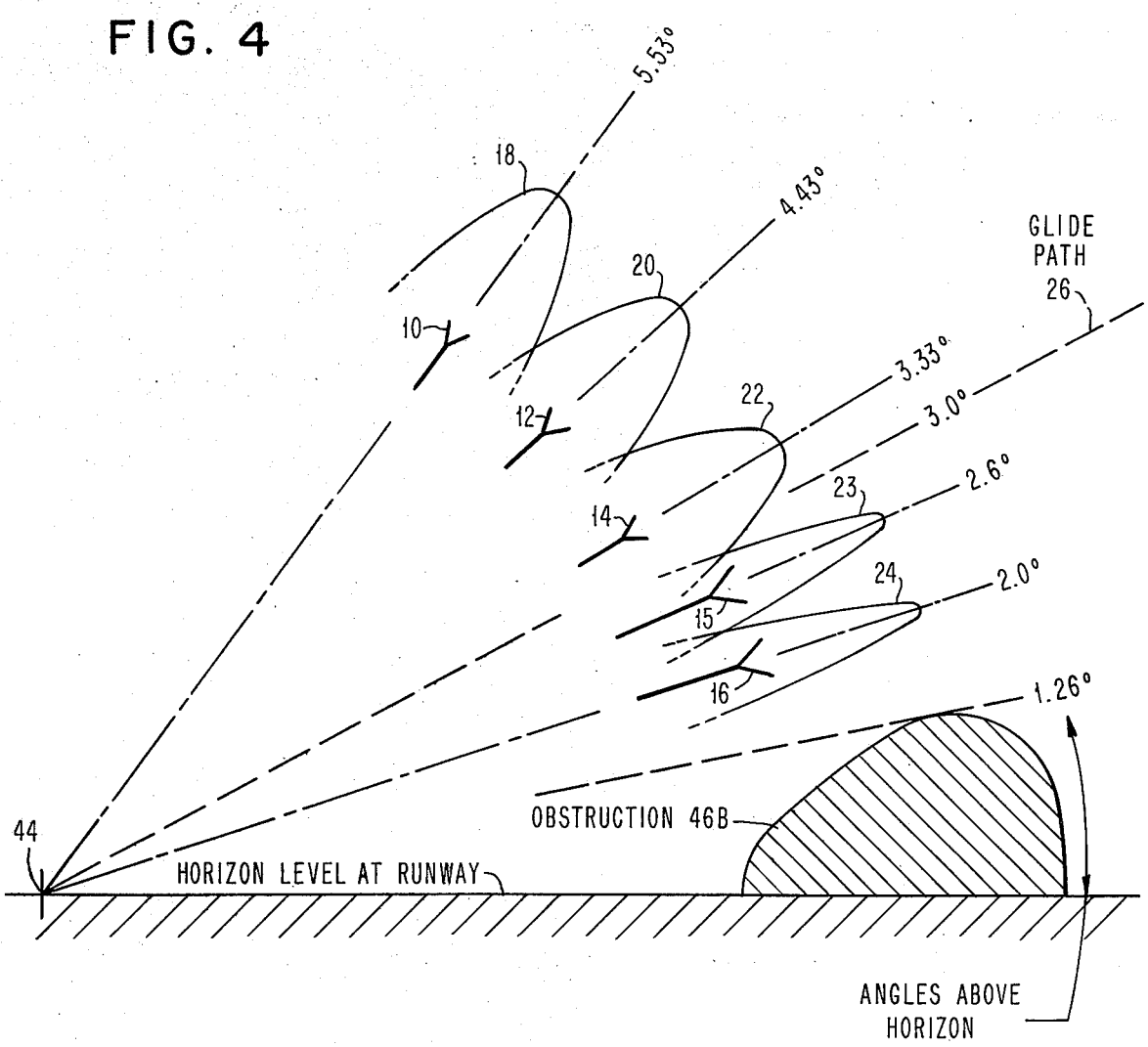

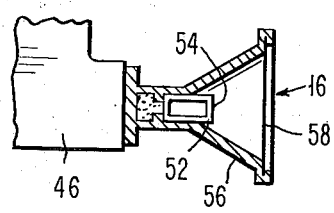
FIG. 6
FIG. 5
FIG. 7
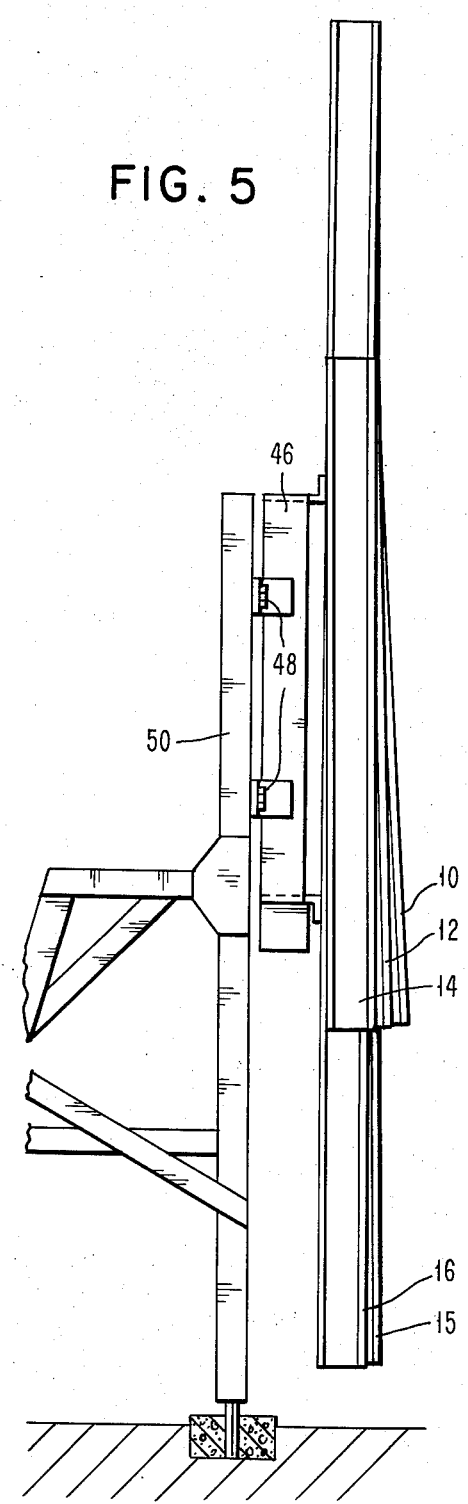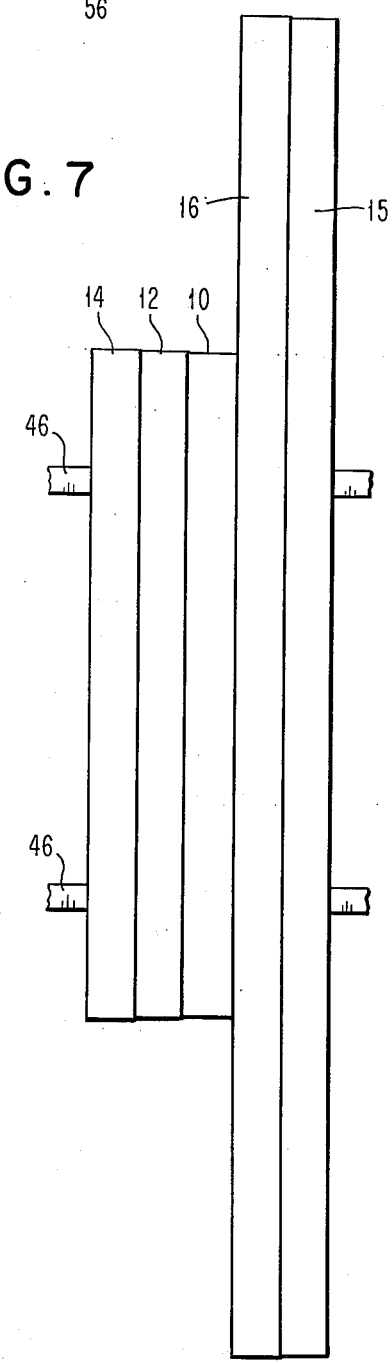

MULTIPLE BEAM GLIDE SLOPE RADIO NAVIGATION METHOD WITH TWO CLASSES OF BEAMS

CROSS REFERENCES TO RELATED U.S. PATENTS AND PATENT APPLICATION

U.S. Patent application Ser. No. 473,408 filed May 28, 1974 by Donald J. Toman for METHOD OF TRANSMITTING GLIDE SLOPE NAVIGATION SIGNALS FOR AIRCRAFT and assigned to the same assignee as the present application.

U.S. Pat. No. 3,487,411 issued Dec. 30, 1969 to Donald J. Toman for MULTIPLE-BEAM GUIDANCE MEANS FOR AIRCRAFT APPROACH AND LANDING.

U.S. Pat. No. 3,774,214 issued Nov. 20, 1973 to Donald J. Toman and Lloyd J. Perper for SCANNING BEAM GUIDANCE METHOD AND SYSTEM and assigned to the same assignee as the present application.

U.S. Pat. No. 3,793,597 issued Feb. 19, 1974 to Donald J. Toman for MODULATION SYNTHESIS METHOD AND APPARATUS and assigned to the same assignee as the present application.

This invention relates to radio navigation systems for aircraft, and more particularly to radio navigation systems for producing glide slope path defining signals for instrument landings in difficult airport sites. The invention is particularly useful for systems operating at microwave frequencies.

In the most commonly used instrument landing systems, the glide slope path defining signals are radiated at frequencies from about 329 to 335 MHz, and the surface of the ground is used as a signal reflector to form the radiation pattern. Consequently, the signal is extremely sensitive to irregularities and obstructions at the ground plane. Where serious obstructions such as surrounding hills are encountered, either the hills must be removed at great expense, or the instrument landing system cannot be used. Attempts have been made to employ signal radiating elements which do not depend upon the ground plane as a reflector, but efficient radiating elements operating at the above-mentioned frequencies which do not use the ground plane as a reflector are quite expensive, and have been found to encounter other problems. For instance, at UHF frequencies, the near field of the signal extends so far out that interference occurs through the presence of relatively distant objects protruding above the horizon so that reliable and accurate operation is difficult.

Various proposals have been made for microwave frequency systems employing scanning beams for the transmission of glide slope navigation information. Such systems do not rely upon the ground as a reflector, and, at microwave frequencies, the near field does not extend out so far. This avoids some of the problems of the conventional systems operating in the 300 MHz range. However, physical obstructions beneath the glide path are still a problem. One approach in solving this problem is presented and claimed in my prior application Ser. No. 473,408 filed May 28, 1974 for a METHOD OF TRANSMITTING GLIDE SLOPE NAVIGATION SIGNALS FOR AIRCRAFT, and assigned to the same assignee as the present application. In the method described in that patent application, a plurality of relatively narrow microwave beams are employed in a scanning beam array, and the antenna array is tilted upwardly so that the lowermost beam substantially avoids serious interference from the highest obstacle on the horizon. The modulation signals on the separate beams are then reprogrammed to lower the glide slope plane defined by the signals to the desired glide slope angle, which is usually three degrees for conventional aircraft. The results with the method of that prior system are excellent, and the principles of that prior system may be combined with the present invention to provide a superior result. However, that prior system is subject to the limitation that the antenna cannot be aimed so that the center line of the lowermost beam is closer to the angle of interception of the obstruction on the horizon than about 80 percent of the angular width of the lowermost beam. Where the most economical number of beams and antenna radiating elements is employed, preferably about four, the individual beams are uniformly about 1.9 degrees in width in elevation. Thus, there is a serious limitation on the prospect for accommodating for difficult sites with high obstructions beneath the glide path.

One solution is to provide narrower beams at the bottom of the array of beams. The principle of using a narrow beam at the bottom of an array of beams was disclosed in my prior U.S. Pat. 3,487,411 entitled MULTIPLE-BEAM GUIDANCE MEANS FOR AIRCRAFT APPROACH AND LANDING. However, that patent discloses a series of eight beams which are progressively graded in width from the narrowest at the bottom to the widest at the top. That arrangement possesses a number of serious disadvantages including especially a lack of economy in the number of beams and the number of radiating elements, and an apparent lack of uniformity in signal radiation energy versus angle of elevation. Furthermore, the arrangement of progressively graded beam widths is not clearly and easily adaptable to the combination of switched scan and pulse duration modulation for providing conventional and compatible 150 and 90 Hz fly up and fly down modulation signals, as preferred in the present invention and in related systems.

Accordingly, it is an important object of the present invention to provide an improved method for the production of glide slope signals having improved clearance characteristics with respect to obstacles and irregularities on the horizon.

Another object of the present invention is to provide an improved method for the production of glide slope signals which is characterized by a high degree of economy while maintaining high signal quality.

Another object of the present invention is to provide an improved method for the production of glide slope signals having substantially uniform signal radiation energy at all elevation radiation angles within the radiation pattern.

Other objects and advantages of the invention will be apparent from the following specification and the accompanying drawings.

In carrying out the invention, there is employed a method of radiating a pattern of navigation guidance signals to an aircraft to define a glide slope guidance path with a minimum of distortion from the terrain and structures beneath the guidance signal pattern comprising transmitting the signals in a pattern of beams of carrier energy with different beams spaced at different angles above and below the guidance path, said beams comprising a class of upper beams and a class of lower beams, said class of upper beams consisting of a plurality of beams of uniform angular width in elevation and having a uniform angular center-to-center beam spacing in elevation, said class of lower beams consisting of at least one beam, each beam of said lower beams having a reduced angular width in elevation which is a single predetermined fraction of the width of each of said upper beams, each of said lower beams having a center line angular spacing in elevation beneath the center line of the next higher beam which is generally reduced from the spacing between said upper beams in proportion to the reduced beam width, switching carrier frequency energy in a sequence from one beam to another to radiate energy in all of the beam positions to establish the pattern of beams, the peak energy radiated at the center lines of each of said upper beams being substantially uniform, the peak energy radiated at the center lines of each of said lower beams being proportional to the peak energy radiated in each of said upper beams, the proportion being an inverse function of the respective beam widths.

In the accompanying drawings:

FIG. 4 is a schematic representation corresponding to FIG. 2, but showing the antenna array and the associated signal beams adjusted upwardly to avoid a higher obstruction.

FIG. 5 is a side view of an antenna array which may be employed in carrying out the invention.

FIG. 6 is a top sectional view of one of the antennas of the array of FIG. 5.

FIG. 7 is a front view of the antenna array of FIG. 5.

Figure 1:
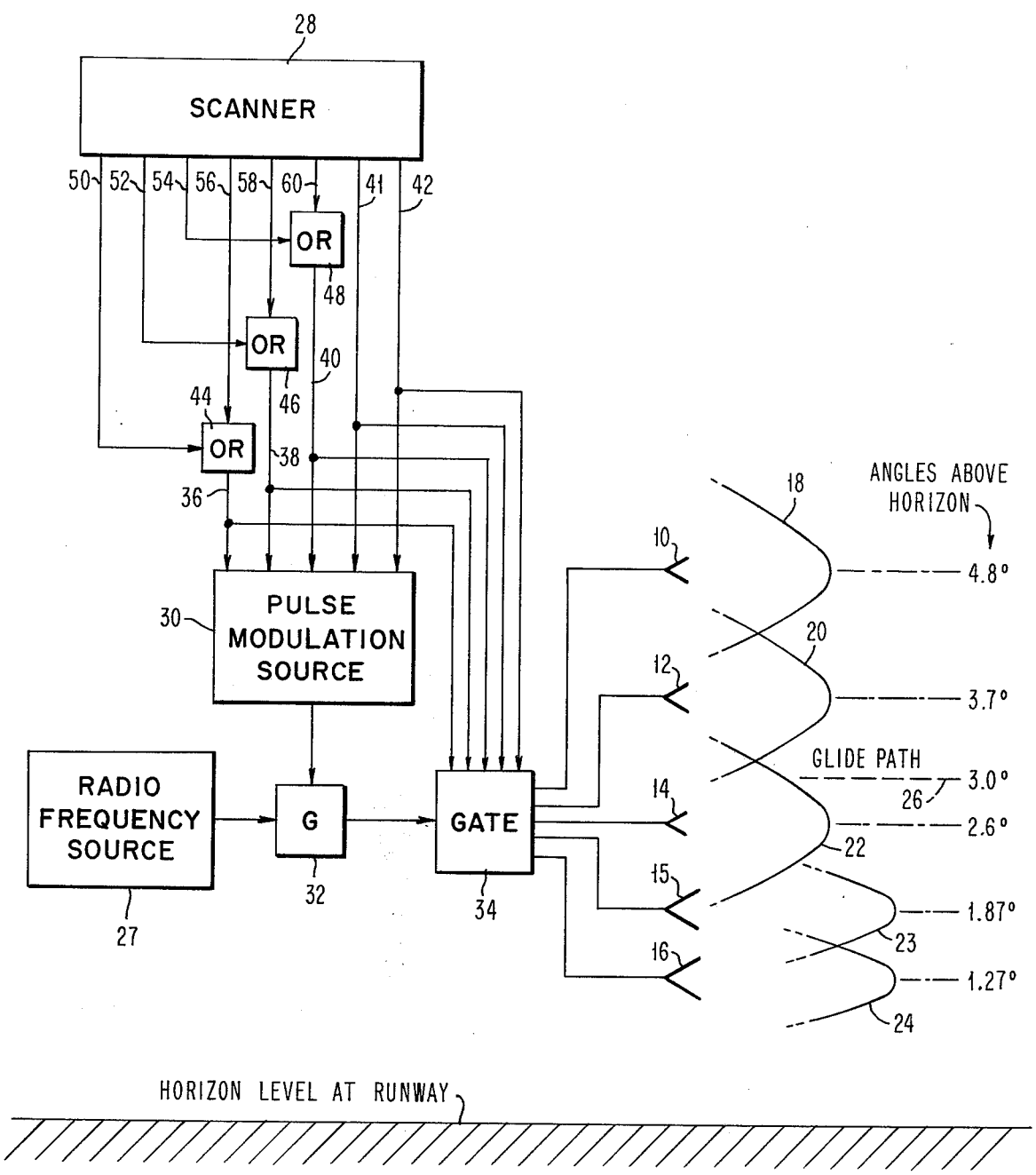
FIG. 1 is a schematic circuit diagram of a system which may be used in carrying out the method of the present invention combined with a schematic representation of the signal beams provided by the system.

Referring more particularly to the drawings, in carrying out the present invention, in a preferred form thereof, there is provided a glide slope signal transmission system illustrated schematically in FIG. 1. The transmission system provides navigation signals to an array of five separate navigation signal antenna elements 10, 12, 14, 15, and 16. These antenna elements (sometimes referred to below simply as antennas) are schematically positioned to correlate with their separate contributions to a combined signal pattern which is radiated by the combination of antenna elements. Thus, the respective antenna elements 10–16 are effective to set up individual signal radiation beams schematically indicated at 18, 20, 22, 23, and 24. The individual beams 18–24 contain modulation which defines a glide path in space indicated by the dotted line 26. The radio signals from all of the antenna elements 10–16 are at the same carrier frequency. However, the glide path 26 is defined by providing different proportions of modulating frequency tones at 90 and 150 Hz in the respective beams. Thus the 150 Hz modulation predominates in the beams 22, 23, and 24, and the 90 Hz modulation predominates in the beams 18 and 20. The carrier frequency energy is switched in a sequence from one antenna element to another, and consequently the beams 18–24 are sometimes referred to collectively as constituting a switched scanning beam, and the individual beams 18–24 are referred to as providing individual switched portions of the scanning beam.

The arrangement of the antennas 10–16 and the beams 18–24 in this drawing are schematic representations only. The actual radiation beams are directed outwardly in a fan configuration, rather than in a parallel beam configuration as illustrated. The separations of the beams 18–24 in the vertical dimension in this drawing are thus representative of angular separations of the beams in the actual radiation pattern. As indicated in the angular scale to the right of the drawing, typical angular orientations of the beams above the horizon are 1.27°, 1.87°, 2.6°, 3.7° and 4.8°. The glide slope course plane is at the conventional three degrees above the horizon. The word "horizon" is used in this specification in a scientific sense, as used in astronomy, to mean a plane tangent to the earth's surface at a particular point (here, at the surface of an airport runway). This is sometimes referred to more distinctively as the "sensible horizon".

The beams are of two classes, the upper beams 18, 20, and 22, and the lower beams 23 and 24. The upper beams are of uniform vertical width and at center-to-center vertical spacings of 1.1°. The lower beams are narrower than the upper beams, but are also of uniform vertical width and at center-to-center vertical spacings of about 0.6°. The beams are all preferably relatively narrow in vertical dimension, and relatively wide in the horizontal dimension to provide wide angle coverage in azimuth, accurately defining the glide slope plane over a relatively wide azimuth sector.

More particularly, the relatively narrow vertical dimension of each of the upper beams is preferably under two degrees at the minus three decibel signal energy level down on each side of the center line from the peak energy level at the center line. The nominal vertical beam width of each upper beam in a preferred embodiment of the invention is 1.87°. The nominal vertical beam width of each lower beam is 0.93°, which is essentially one-half of the width of each of the upper beams. It has been found that, in order to avoid undesirable reflections, or other interference, the center line of the lowest beam should be maintained at an angle above the horizon or above any substantial obstruction on the horizon of at least about eighty percent of the vertical beam width of the lowermost beam. With the beam elevations and dimensions given above, the lowermost beam is at 1.27° above the horizon, and that beam is 0.93° in width in elevation. 80 percent of that beam width is 0.74°, which means that the highest level for obstructions above the horizon is 1.27° minus 0.74°, which is 0.53°. Thus, with the beam angles listed above, the clearance of 80 percent of the beam width of the lowest beam can be maintained, even with an obstruction which rises to 0.53° above the horizon. This illustrates a remarkable improvement over the arrangement without two narrow beams at the bottom, as disclosed and discussed in the prior related patent application Ser. No. 473,408. In the basic arrangement in that prior patent application, the three uppermost beams were aligned at the same angles of 4.8°, 3.7°, and 2.6° as are the three upper beams in the presently described embodiment of the present invention. However, there only one additional beam having the same beam width as the upper three was provided at the bottom at an elevation of 1.5°. With that arrangement, in order to maintain a clearance of 80 percent of the lowermost beam width between the horizon and the center line of the lowermost beam, no obstruction could be accommodated above the horizon level. Thus, by employing two narrow beams in place of a single wider beam at the lowermost beam position, in accordance with the present invention, the array is capable of accommodating for an obstruction as high as 0.53° without any upward adjustment of the entire array. This feature is illustrated and described more fully below in connection with FIG. 2 of the drawings.

In the preferred embodiment of the invention, the various beams are radiated from the various antenna elements 10–16 by rapidly switching radio frequency energy from one antenna element to another. The energy may come from a single radio frequency source 27. This arrangement is referred to as a switched scanning beam system, and it is carried out in accordance with the basic teachings of a related U.S. Pat. No. 3,774,214 issued Nov. 20, 1973 for a SCANNING BEAM GUIDANCE METHOD AND SYSTEM, and assigned to the same assignee as the present application. The disclosure of that patent is primarily related to the localizer (azimuth guidance) function of an instrument landing system. However, the same principles are directly applicable to the present glide slope system. The present invention will often be practiced in conjunction with an associated localizer for azimuth guidance, and generally following the teachings of the above patent.

In addition to the radio frequency source 27, the transmitter system feeding the antennas 10–16 includes a scanner 28, a pulse modulation source 30 controlled by the scanner through connections 36, 38, 40, 41, and 42, and a modulator gate 32 controlled by the pulse modulation source 30. The transmitter also includes a gating device 34 by means of which the modulated radio frequency signals are gated to the respective antenna elements 10–16. The gating device 34 is also controlled by the scanner 28 through branches of control connections 36, 38, 40, 41, and 42. The modulation provided by the pulse modulation source 30 is preferably a pulse duration modulation in which the modulation is synchronized with the scanning of the beam by the switching of the radio frequency source beam energy from one antenna element to another. Thus, as the radio frequency is switched to each antenna element 10–16, the duration of the pulse (actually a burst of radio frequency energy) is carefully controlled at gate 32 by the pulse modulation source 30 to provide the desired modulation on that particular beam. Since the pattern of modulation to be provided on each of the various beams is constant, there is a complete repetition of the modulation sequence and therefore the different modulation signals required for the different sequences of pulses for each beam are built into the pulse modulation source. Preferably, the pulse modulation is carried out by means of digital circuits and by means of digital synthesis of the modulation in accordance with the teachings of a prior U.S. Pat. No. 3,793,597 issued on Feb. 19, 1974 to Donald J. Toman for a MODULATION SYNTHESIS METHOD AND APPARATUS, and assigned to the same assignee as the present application.

The scanner 28 is operable to issue timing signals in a sequence on the output lines 36–42 to control the gating of energy respectively to the antenna elements 10–16, and to control the operation of the pulse modulation source 30 to provide the appropriate modulation in synchronism with the switching of energy to the respective antenna elements. The scanner provides an output on only one of the output connections 36–42 at any one time. For instance, at the interval when the scanner provides an output at connection 36, that output is received by the pulse modulation source 30 and also by the antenna switching gate 34. As a result, the energy is modulated and switched through the antenna switching gate 34 to the antenna element 10. In similar fashion, scanner signals on the various switching gate 34 inputs cause the energy to be switched respectively to the antenna elements 12, 14, 15, and 16. The switching gate 34 may be a microwave switch of the type referred to as a shunt-diode switch, and may employ PIN diodes.

The glide path 26 is defined by the modulation applied to the different beams 18–24. Thus, the glide path is determined by the combination of the respective angular positions of the different beams above the horizon and the mixtures of modulation applied to each of the beams, the 150 Hz (fly up signal) modulation predominating in the beams 22, 23, and 24 which appear below the glide path 26, and the 90 Hz (fly down signal) modulation predominating in the beams 18 and 20 above the glide path 26. However, the modulation patterns applied to the beams above and below the glide path 26 need not be perfectly symmetrical, and the glide path 26 need not necessarily occur at an angle which is exactly spaced between the center lines of the beams 20 and 22. As indicated in FIG. 1, this is not the case in the example given, for an angle midway between the center lines of beams 20 and 22 would be 3.15° instead of 3.0° as shown. It is a feature of the invention, following the teachings of the aforementioned prior Pat. Nos. 3,774,214 and 3,793,597, that the programming of the pulse modulation source 30 can be easily and simply changed to adjust the mixtures of the 150 Hz and 90 Hz tones on the individual beams to define the glide path 26 at any desired angle.

The azimuth width of all of the beams is substantially the same. Since the beams 23 and 24 of the lower class are each essentially one-half the vertical width of the beams 18, 20 and 22 of the upper class, the peak energy of beams 23 and 24 at the respective beam center line is substantially twice as high as the peak energy of each of the beams 18, 20, and 22. Accordingly, in order to provide a substantially uniform signal radiation energy level at all radiation angles within the radiation pattern, the radio frequency energy is preferably switched to each of the lower beams 23 and 24 one-half as often as it is switched to the upper class of beams 18, 20, and 22. Thus, the reduction in the number of times that each of the beams 23 and 24 is energized is inversely proportional to the peak energy relationships between the lower beams 23, 24 and the upper beams 18, 20, 22.

This relationship is signified by the arrangement of the outputs of the scanner 28 with the OR gates 44, 46, and 48. Thus, there are a total of eight outputs 50, 52, 54, 56, 58, 60, 41, and 42 from the scanner 28. A complete sequence of outputs from the scanner 28 involves a series of commutation pulses appearing one at a time on each of these output connections, not necessarily in direct positional order from left to right or right to left. However, it is apparent that during any one sequence, two energizing signals appear on connection 36 which is the output of OR gate 44 by reason of both the input from scanner connection 50 and the input from scanner connection 56. Similarly, in each complete sequence, two control pulses appear on connection 38 at the output of OR gate 46 by reason of both the inputs from connections 52 and 58 from scanner 28. By the same reasoning, two outputs appear on connection 40 from OR gate 48 from each of the input signals from connections 54 and 60. These signals on control connections 36, 38, and 40 control the upper class of beams 18, 20, and 22 from antenna elements 10, 12, and 14. By contrast, each sequence of outputs from scanner 28 provide only one set of energizing pulses on connections 41 and 42 which respectively control the signals from antenna elements 15 and 16 for the narrow beams 23 and 24. Thus, beams 23 and 24 are energized at one-half the commutation frequency of the upper beams 10, 18, 20, and 22.

While a particular relationship for this embodiment has been selected in which the lower beams are each one-half the width of each of the upper beams, and have twice the peak energy, and are energized at one-half the frequency of the upper beams, and while this particular arrangement is regarded as preferred because of its simplicity, it is quite apparent that other relationships could be selected. For instance, the lower beams could be one-third the width of the upper beams, the peak energy of the lower beams could be three times the peak energy of the upper beams, and the lower beams could be energized at one-third the frequency of the upper beams. Since the switched scanning rate is quite high, virtually any reasonable relationship of beam width, peak beam energies, and scanning frequencies can be selected.

The 150 Hz and 90 Hz modulation applied to the individual beams for the purpose of establishing the three degree glide path plane 26 pictured in FIG. 1 is shown by way of example in the following table. The table assumes a conventional 80% modulation of the carrier for the glide slope function, and the modulation index for the respective modulation frequencies is given in terms of the contribution of each modulation signal frequency to the total modulation:

TABLE I.

| Beam Identification | 90 Hz Modulation Index | 150 Hz Modulation Index |
|---|---|---|
| 18 | 0.656 | 0.144 |
| 20 | 0.528 | 0.272 |
| 22 | 0.400 | 0.400 |
| 23 | 0.336 | 0.464 |
| 24 | 0.256 | 0.544 |

Figure 2:
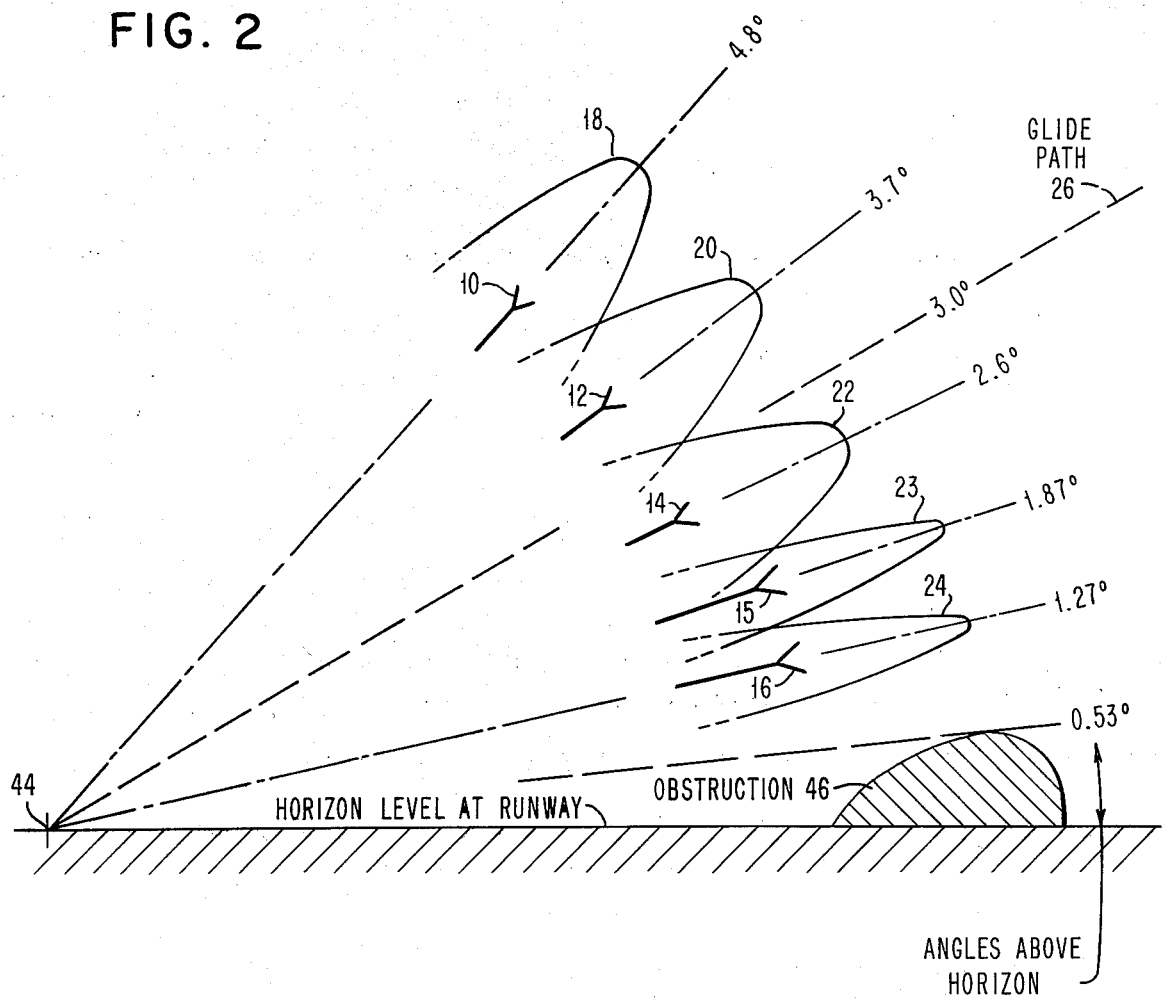
FIG. 2 is a schematic representation of the signal beams provided by the system of FIG. 1 presented in polar coordinate form.

FIG. 2 is a schematic polar coordinate representation of the physical positions of the antenna elements 10–16 and the beams 18–24 of FIG. 1. In this figure, the angular scale is greatly exaggerated in order to promote an understanding of the principles of the invention. However, the angles are shown in correct angular proportionality. The angles of the respective beam center lines, and the glide path 26, are illustrated about a common origin at the horizon level of the runway as indicated at 44. The center lines of the respective beams are angularly spaced above the horizon in positions corresponding to the positions shown in rectangular coordinates in FIG. 1. Also, the glide path 26 is illustrated at the same relative position.

The elevation angles for the various antennas and beams illustrated in FIGS. 1 and 2 may be used very effectively in locations where there is virtually no obstruction above the horizon in the approach path to the airport runway. However, because of the employment of the narrow beams 23 and 24 at the bottom of the array, the required clearance of 80% of the beam width of the lowermost beam above the highest obstruction in the space beneath the glide path can be maintained, with these angles of radiation, for obstructions which rise as high as 0.53° above the horizon. This is illustrated by obstruction 46 in FIG. 2. Thus, assuming that the beam width of the lowermost beam 24 is 0.93°, 80% of that beam width is 0.74°, and an elevation 0.74° beneath the center line of the lowermost beam 24 at 1.27° is 0.53°, the elevation illustrated for the obstruction 46.

This is believed to dramatically illustrate the immediate advantage of employing two classes of beams, with the members of the lower class being narrower than the members of the upper class. Thus, without the necessity for tilting the antenna upwardly, an obstruction of over one-half degree in elevation can be accommodated for.

The obstruction 46 may be substantially beyond the end of the runway itself, and still cause serious distortions of the signal from the conventional ILS system. The obstruction may have a relatively gradual slope, almost constituting a continuous upward slant of the terrain, or it may be relatively abrupt. The gradual slope is most troublesome, but in either case, the obstruction will cause distortions of the signals. In the commonly used prior art systems, such an obstruction would make a glide slope navigational aid completely unworkable.

Figure 3:
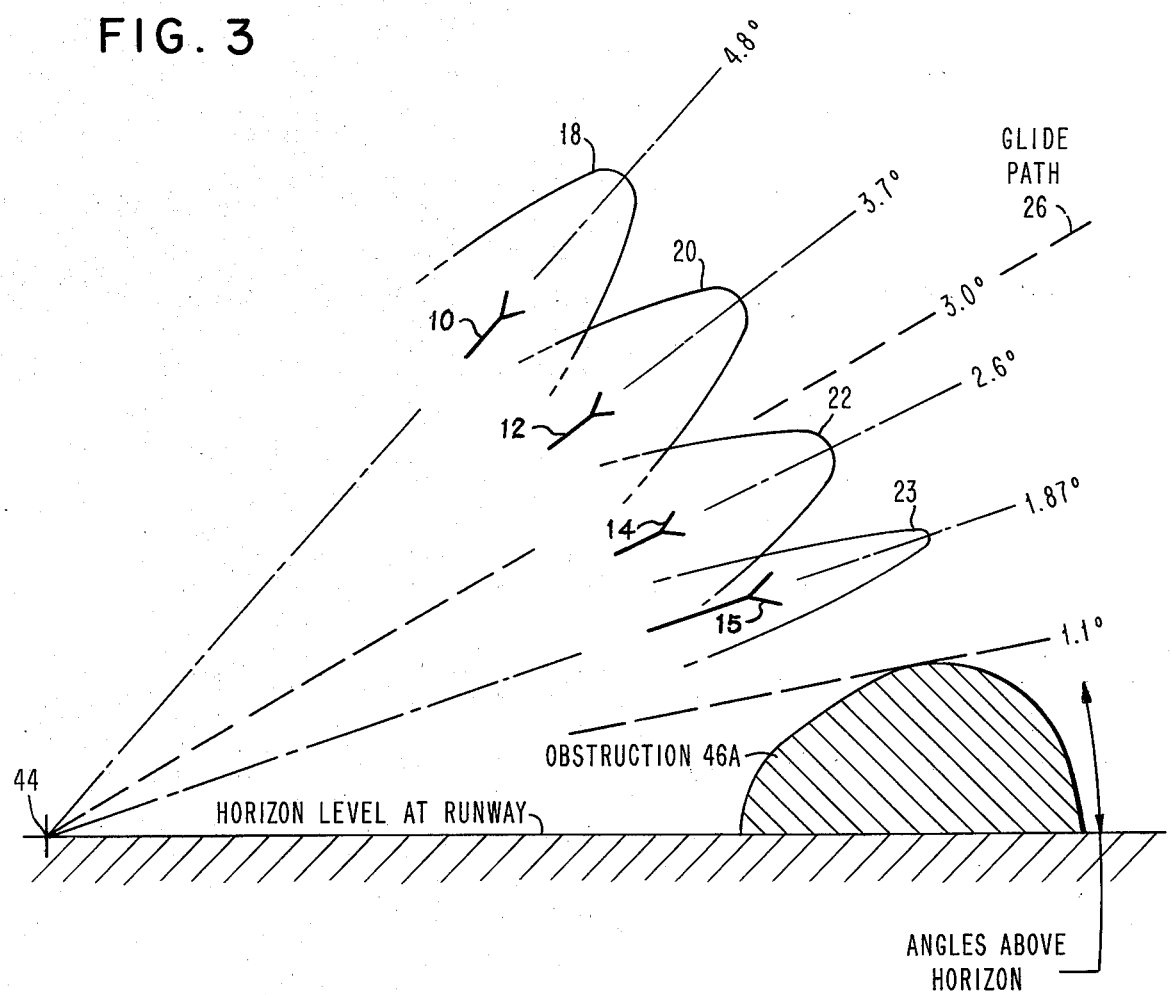
FIG. 3 is a schematic representation corresponding to FIG. 2, but showing the lowermost beam omitted, and illustrating how the omission of that lowermost beam permits accommodation of the signal pattern to a higher obstruction.

FIG. 3 is a schematic polar coordinate representation corresponding to FIG. 2, but illustrating a modification in which antenna element 16 and the corresponding lowermost beam 24 have been completely eliminated. This is done in order to accommodate for a still higher obstruction 46A which may protrude up to 1.1° in elevation above the horizon without violating the requirement that the obstruction should not be within 80% of the beam width from the center line of any beam. As a matter of fact, the 1.1° elevation of the obstruction 46A brings the obstruction essentially at an angle which is 80% of the beam width from the center line of beam 23 and also 80% of the beam width from the center line of beam 22. It is one of the advantages of having the narrow lowermost beam 23 that adequate clearance signals are obtainable beneath the glide path 26 even though beam 24 has been omitted. For the FIG. 3 embodiment, the same modulation program given above in Table I can be used for beams 18–23.

While beam 24 is shown in FIG. 3 as having been completely omitted, it is also possible, and sometimes advantageous, to include the beam 24 to provide additional fly up clearance signals, but to attenuate the beam 24 in order to reduce the reflections and interference of the beam 24 with the obstruction 46A. The advisabilty of this procedure is determined partly by the various characteristics of the obstruction 46A, including the shape of the obstruction, and the distance of the obstruction from the end of the runway. Accordingly, the inclusion of the beam 24 with a reduced or attenuated peak energy in a system installation which may include an obstruction higher than 0.53° as illustrated in FIG. 2, and perhaps lower than the 1.1° illustrated in FIG. 3 should be regarded as still another modification of the invention which is not specifically illustrated.

FIG. 4 illustrates still another modification of the embodiment of FIGS. 1 and 2 which accommodates for an even higher obstruction 46B on the horizon which may be as high as 1.26°. In order to maintain the 80% beam width clearance between the obstruction and the center line of the bottom beam 24, the entire antenna array consisting of elements 10–16 is tilted upwardly by 0.73° so that the center line of the bottommost beam is at 2° above the horizon level, and the other beams are correspondingly raised to higher angles, as illustrated in FIG. 4. If the same programming signals were then applied to each of the antenna elements, the glide path 26 also would be raised by 0.73° to 3.73°. However, this is not desired, since the glide path is to be maintained at the standard 3.0°. Accordingly, in order to lower the glide path, the modulation is changed from the modulation previously stated in Table I to a new modulation program providing the modulation as given in Table II below. Again, the table assumes an 80% modulation of the carrier, and the modulation index for the respective modulation frequencies is given in terms of the contribution of each modulation signal frequency to the total modulation:

TABLE II.

| Beam Identification | 90 Hz Modulation Index | 150 Hz Modulation Index |
|---|---|---|
| 18 | 0.752 | 0.048 |
| 20 | 0.624 | 0.176 |
| 22 | 0.496 | 0.304 |
| 23 | 0.432 | 0.368 |
| 24 | 0.352 | 0.448 |

It is observable in the above table that since the 3.0° glide path is below the center line of the beam 22, that beam is now modulated with a slight preponderance of 90 Hz fly down signal rather than a predominance of 150 Hz fly up signal as previously.

The sensitivity of the pattern of signals, that is the rate at which the ratio of the 90 and 150 Hz fly down and fly up modulation varies in relation to shifts in position away from the glide path 26 are such as to provide a nominal path width of plus or minus 0.72° on each side of the glide path 26. This corresponds to a difference in depth of modulation of 0.175 between the 90 and 150 Hz modulation signals, and corresponds to a full scale deflection of the standard aircraft glide slope indicator instrument.

The physical adjustment of the antenna, and the electrical adjustment of the programming may be adapted to exact accommodation for obstructions at angles in the entire range up to as much as 1.26°. In each case, the physical angle of the antenna array, and the electrical programming of the signals applied to the antenna array elements, are suitably adjusted to accommodate for the angle of the obstruction in order to maintain the best possible signal pattern within the space available above the angle of the obstruction angle. As previously indicated in connection with the description of FIG. 2, no physical adjustment of the antenna array, or reprogramming, is required for accommodation of obstructions of up to 0.53°.

With the arrangement of FIG. 4 having the maximum angular upward tilt of the antenna array, it may be possible to eliminate the uppermost beam 18 and the antenna element 10 for producing that beam, since adequate coverage should be available for the space above the glide path 26 from the beams 20 and 22.

All of the above descriptions and explanations of the invention have been exemplified in terms of a 3° glide slope path which is standard for conventional aircraft. However, it will be quite apparent that the principles of the invention are also very valuable for use in the establishment of other glide path angles which may be usable with conventional aircraft, or with other aircraft such as helicopters or "short take-off and landing" (STOL) aircraft which are designed especially to permit steeper angles of descent. The present invention is very useful for helicopter and STOL ports because such ports are often surrounded by high obstructions.

The modification of the system such as for helicopters or STOL aircraft may involve modification of the angles of the individual beams, modifications of the beam widths, and modification of the programming of the modulation applied to the individual beams to achieve virtually any desired glide path angle, with the necessary clearance from the nearest obstructions in the airport approach path.

By way of specific example, the arrangements illustrated in FIGS. 2, 3, and 4 may be modified to provide a 6° glide path suitable for use by STOL aircraft by simply multiplying the individual angles of displacement of all of the beams above the horizon by a factor of 2, and by doubling the widths of each of the individual beams. With such a modification, obstructions of twice the elevations respectively indicated in FIGS. 2, 3, and 4 may be accommodated. Furthermore, with such a simple modification which builds directly upon the teachings given above in connection with FIGS. 2, 3, and 4, the same modulation indices may be employed for the various beams as are set forth in Tables I and II above.

FIG. 5 is a side view of a physical antenna array which is capable of providing the signals originally discussed above in connection with FIGS. 1–4 when transmitted with a radio carrier signal at microwave frequencies in the order of 5,200 MHz. The radiating elements 10–16 consist of substantially vertically arranged slotted wave guides positioned side by side. Each of the wave guides 10, 12, 14 is approximately 8 feet in length. Each of the wave guides 15 and 16 is approximately 16 feet in length. All of the wave guides are designed to provide vertical polarization. The wave guides are typically fed from the bottom end, and the loading slots in each wave guide are designed to provide a slight upward "squint" angle of about 1.3° away from a direction normal to the front face of the wave guide. Thus, the element 16 for the lowermost beam, will be tilted downwardly at an angle of about 0.03° in the arrangement of FIGS. 1 and 2 to provide the required net upward slant to the beam of 1.27°. The other wave guides are tilted upwardly at the required angular intervals by appropriate forward displacement at the bottom, as illustrated in the drawing.

All of the wave guides are mounted and supported upon a common mounting base 46 which is fastened by suitable mounting bolts at 48 to a stationary supporting frame 50. The elevation angle of the entire array is adjustable by adjustment at the mounting bolt connections 48 to achieve the desired elevation angles as described above.

FIG. 6 is a sectional top view of the wave guide radiator 16 of the antenna array of FIG. 5 enlarged to approximately twice the scale of FIG. 5, and showing part of the mounting base 46.

FIG. 7 is a front view of the antenna array of FIG. 5 showing how the individual wave guides are positioned side by side in a substantially parallel appearing arrangement as viewed from the front.

Referring again to the sectional view of FIG. 6, the wave guide itself has a rectangular cross section as indicated at 52. An electrical industries association (EIA) standard WR-187 wave guide may be used for this purpose. The loading slots are cut into one of the narrow (edge) sides indicated at 54. These loading slots may preferably be cut in a direction which is generally transverse to the center line of the wave guide and the number and arrangement of the slots is preferably designed to achieve the desired beam characteristic in accordance with principles taught in standard textbooks on slotted wave guide design. For instance, see the ANTENNA ENGINEERING HANDBOOK published by McGraw-Hill in 1961 and edited by Henry Jasik. Chapter 9 is particularly pertinent. The radiating element also includes a beam shaping horn structure indicated at 56. Over the end of the horn there is attached a "radome", a non-metallic protective cover 58 which does not absorb the useful signals, but which provides weather protection to the radiating element.

While this invention has been shown and described in connection with particular preferred embodiments, it is apparent that various changes and modifications, in addition to those mentioned above, may be made by those who are skilled in the art without departing from the basic features of the invention. Accordingly, it is the intention of the Applicant to protect all variations and modifications within the true spirit and valid scope of this invention.

claim:

1. A method of radiating a pattern of navigation guidance signals to an aircraft to define a glide path with a minimum of distortion from the terrain and structures beneath the guidance signal pattern comprising transmitting the signals in a pattern of beams of radio carrier frequency energy with different beams positioned at different angles above and below the guidance path, switching carrier frequency energy in a sequence from one beam to another to radiate energy in all of the beam positions to establish the pattern of beams, applying a program of modulation to the radio carrier frequency energy for each of said beams to define the glide slope path, said beams comprising a class of upper beams and a class of lower beams positioned beneath said upper beams, said class of upper beams consisting of a plurality of beams of uniform angular width in elevation and having a uniform angular center-to-center beam spacing in elevation, said class of lower beams consisting of at least one beam, each beam of said lower beams having a reduced angular width in elevation which is a single predetermined fraction of the width of each of said upper beams, each of said lower beams having a center line angular spacing in elevation beneath the center line of the next higher beam which is generally reduced from the spacing between said upper beams in proportion to the reduced beam width, the peak energy radiated at the center lines of each of said upper beams being substantially uniform, the peak energy radiated at the center lines of each of said lower beams being proportional to the peak energy radiated in each of said upper beams, the proportion being an inverse function of the respective beam widths.

2. A method as claimed in claim 1 wherein said sequence of switching of carrier frequency energy is carried out by energizing all beams of said class of upper beams the same number of times in each switching sequence and by energizing each beam of said class of lower beams by a number of times less than the number of energizing times for each of said upper beams and having an inverse proportional relationship to the peak energy radiated in each lower beam versus the peak energy radiated in each of said upper beams to thereby provide for substantially uniform signal radiation energy at all elevation radiation angles within the radiation pattern.

3. A method as claimed in claim 2 wherein said class of lower beams consists of at least two beams.

4. A method as claimed in claim 3 wherein the lowermost beam of said lower beams is reduced in peak energy level to reduce reflections from obstructions and to thereby reduce distortion of the signal pattern while maintaining fly up clearance signals in the near range.

5. A method as claimed in claim 3 wherein each beam of said class of lower beams has an angular width in elevation substantially equal to one-half the angular width in elevation of each beam of said class of upper beams.

6. A method as claimed in claim 5 wherein each beam of said class of upper beams has an angular beam width in elevation of less than two degrees and each beam of said class of lower beams has an angular beam width in elevation of less than one degree when the margins of each beam for determining beam width are defined as the positions on the beam contours which are down three decibels in signal strength from the peak signal strength at the beam center line.

7. A method as claimed in claim 5 wherein said class of upper beams consists of three beams and said class of lower beams consists of two beams.

8. A method as claimed in claim 2 wherein said carrier frequency energy is radiated at microwave frequencies.

9. A method as claimed in claim 2 wherein the carrier frequency energy is modulated by controlling the duration of the burst of carrier frequency energy radiated at each beam position during each switching sequence to thereby provide pulse duration modulation of the carrier frequency in each beam position.

10. A method as claimed in claim 1 wherein the modulation applied to the radio carrier energy signifies two different fixed tone modulation frequencies respectively signifying fly up and fly down information, said modulation for fly up and fly down information being applied to the different beams in different relative proportions to provide a predominance of fly up signal below the glide path and a predominance of fly down signal above the glide path.

11. A method as claimed in claim 1 wherein
all of the separate beams are radiated directionally with a fan shape which is wide in the horizontal and narrow in the vertical direction.

12. A method as claimed in claim 1 including
aligning a multiple element antenna array to provide a separate beam of carrier signal radiation from each element to thereby form the pattern of beams,
mechanically adjusting the angular position of the entire multiple element antenna array so that the element producing the lowermost beam is aimed high enough to avoid any substantial line-of-sight obstruction to the lowermost beam to minimize reflections from the obstruction while substantially filling the air space above the obstruction with a guidance signal,
and modifying the program of modulation for each of said beams to re-establish the glide slope path having the desired glide slope angle while compensating for the mechanical adjustment of the antenna array.

13. A method as claimed in claim 12 wherein
the separate beams are radiated from separate slotted wave guide radiation elements.

14. A method as claimed in claim 13 wherein
the wave guide radiation elements are physically arranged at different relative angles to provide the radiation of the pattern of beams spaced at different angles above the horizon.

15. Apparatus for radiating a pattern of navigation guidance signals to an aircraft to define a glide path with a minimum of distortion from the terrain and structures beneath the guidance signal pattern comprising
a plurality of antenna elements,
each element being operable to transmit a separate beam of radio carrier frequency radiation to thereby form a pattern of beams of carrier energy with different beams spaced at different angles above and below the guidance path,
means for switching carrier frequency energy in a sequence from one element to another to radiate energy in all of the beam positions to establish the pattern of beams,
means for applying a program of modulation to the carrier energy switched to each of said elements to define the glide slope path,
said antenna elements comprising at least two different classes including a class for producing upper beams and a class for producing lower beams positioned beneath the upper beams,
said class of upper beam elements consisting of a plurality of elements operable to produce beams of uniform angular width in elevation and having a uniform angular center-to-center beam spacing in elevation,
said class of lower beam elements consisting of at least one element for producing one beam,
each element of said class of lower beam elements being operable to produce a beam having a reduced angular width in elevation which is a single predetermined fraction of the width of each of said beams from said upper beam elements,
each beam from one of said lower elements having a center line angular spacing in elevation beneath the center line of the next higher beam which is generally reduced from the spacing between said beams from said upper elements in proportion to the reduced beam width,
the peak energy radiated at the center lines of each of said beams from said upper elements being substantially uniform,
the peak energy radiated at the center lines of each beam from said class of lower elements being proportional to the peak energy radiated in each beam from said class of upper elements,
the proportion being an inverse function of the respective beam widths.

16. Apparatus as claimed in claim 15 wherein
said means for switching carrier frequency energy in said sequence is operable to energize all elements of said class of upper beam elements the same number of times in each switching sequence and to energize each element of said class of lower beam elements by a number of times less than the number of energizing times for each of said upper beam elements and having an inverse proportional relationship to the peak energy radiated in each lower beam versus the peak energy radiated in each of said upper beams to thereby provide for substantially uniform signal radiation energy of all elevation radiation angles within the radiation pattern.

* * * * *